United States Patent
Corduroy et al.

[11] Patent Number: 5,978,465
[45] Date of Patent: Nov. 2, 1999

[54] METHOD AND APPARATUS FOR ALLOCATING RESOURCES IN A CALL CENTER

[75] Inventors: Ann Corduroy, St. Albans, United Kingdom; Rosemary Glavin, San Francisco, Calif.; Kevin T. Collins, Roseville, Calif.; Felix F. Khouri, San Jose, Calif.

[73] Assignee: Aspect Telecommunications Corporation, San Jose, Calif.

[21] Appl. No.: 08/851,479

[22] Filed: May 5, 1997

[51] Int. Cl.[6] .................................................. H04M 3/00
[52] U.S. Cl. ............................................. 379/265; 379/243
[58] Field of Search ................................... 379/265, 266, 379/307, 242, 243, 196, 197, 198, 199, 201, 207, 133, 134

[56] References Cited

U.S. PATENT DOCUMENTS

| | | | |
|---|---|---|---|
| 5,592,543 | 1/1997 | Smith et al. | 379/265 |
| 5,675,637 | 10/1997 | Szlam et al. | 379/201 |
| 5,680,448 | 10/1997 | Becker | 379/265 |
| 5,768,360 | 6/1998 | Reynolds et al. | 379/265 |
| 5,790,650 | 8/1998 | Dunn et al. | 379/265 |
| 5,832,070 | 11/1998 | Bloom et al. | 379/265 |

*Primary Examiner*—Krista Zele
*Assistant Examiner*—Benny Q. Tieu
*Attorney, Agent, or Firm*—Blakely, Sokoloff, Taylor & Zafman, LLP

[57] ABSTRACT

A system is provided for allocating resources in a call center. The system identifies a record associated with a resource in the call center. The record includes an attribute associated with the operation of the resource. The system controls the operation of the resource in response to the attribute contained in the record associated with the resource. The record associated with the resource is modified in response to a resource change request. The resource change request may be generated by a host coupled to the call center or by a device contained within the call center. The modified record provides a different set of permitted activities for the associated resource. A particular record may contain multiple attributes associated with the operation of the resource.

26 Claims, 8 Drawing Sheets

| | | |
|---|---|---|
| 102 | CLASS OF SERVICE NUMBER | 060 |
| 104 | CLASS OF SERVICE NAME | IN1 |
| 106 | INSTRUMENT TYPE | T |
| 108 | AUTOMATIC ANSWER | Y |
| 110 | AUTOMATIC AVAILABLE | Y |
| 112 | DIRECT TRUNK SELECTION | N |
| 114 | WRAP-UP AFTER INCOMING CALL | N |
| 116 | AUTOMATIC CALL BACK | N |
| 118 | MESSAGE PROMPTS | A |
| 120 | WRAP-UP AFTER OUTGOING CALL | Y |
| 122 | HELP AND MESSAGING | Y |
| 124 | INCOMING CALLS | Y |
| 126 | SUPERVISOR CALLS | Y |
| 128 | OUTBOUND CALLS | N |

FIG. 6

METHOD AND APPARATUS FOR ALLOCATING RESOURCES IN A CALL CENTER

FIELD OF THE INVENTION

The present invention relates to resource allocation systems. More specifically, the invention provides a mechanism for allocating resources in a call center and controlling the operation of those resources.

BACKGROUND

A call center is capable of receiving, processing, and transmitting calls, such as telephone calls, and other information. A particular type of call center may be referred to as an automatic call distributor (ACD). A call center typically has multiple agents for answering incoming calls and placing outgoing calls. A call center may also have agents participating in outgoing call campaigns, typically in conjunction with an outbound call management system. Each agent may be assigned to a particular group, such as an inbound group or an outbound group. Agents can also be assigned to a supervisor team, which represents multiple agents that report to the same supervisor.

In certain situations, it is necessary to restrict an agent's activity to answering calls or handling a particular type of call (e.g., answering only incoming calls). For example, during an outbound campaign, the system placing the outbound calls and controlling the rate at which the calls are placed relies on the availability of the agent to handle an answered call. If the system places outbound calls expecting the agent to be available, but the agent instead places their own call to another agent or a supervisor, or has an incoming call connected to them, the outbound system may not have an agent available to handle an answered outbound call. Additionally, if an agent is assigned to handle incoming calls, but instead places a call to another agent or listens to voice mail messages, the number of queued incoming calls may increase, thereby increasing the waiting time experienced by the callers.

In existing call centers, agents can be manually switched from one group to another (e.g., from an inbound group to an outbound group). This switching may be performed by a supervisor using a terminal or other device coupled to the call center. In other systems, a supervisor may instruct particular agents to switch from inbound call processing to outbound call processing, or vice versa. These manual systems for changing an agent's group assignment are tedious and do not guarantee compliance with the request. For example, an agent may switch groups in response to a supervisor instruction. However, after the supervisor has left the room, the agent may switch to a different group, thereby disrupting the expected operation of the call center.

Additionally, existing call centers do not provide an automated system for controlling the operation or activities of call center resources, such as preventing an agent from making a call to another agent or a supervisor during an outbound campaign. As discussed above, such activity can disrupt the outbound call pacing system.

It is therefore desirable to provide a mechanism for efficiently allocating call center resources and automatically controlling resource activities.

SUMMARY OF THE INVENTION

Embodiments of the present invention provide a system for allocating resources in a call center. Instead of manually allocating call center resources (such as manually switching an agent between groups), embodiments of the invention provide a system for automatically allocating call center resources, without requiring intervention by a supervisor. Additionally, embodiments of the invention provide a mechanism for automatically controlling the activities that can be performed by call center resources. The allocation and control of call center resources can be performed by a device, such as a host computer, coupled to the call center.

In a particular embodiment of the invention, a record is identified which is associated with a resource in a call center. The record includes an attribute associated with the operation of the resource. The operation of the resource is controlled in response to the attribute contained in the record associated with the resource. The record associated with the resource is modified in response to a resource change request.

In other embodiments of the invention, the record contains multiple attributes associated with the operation of the resource.

In a particular embodiment of the invention, the resource change request is generated by a host coupled to the call center.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 6 illustrates an embodiment of a table containing various class of service attributes.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to a system for allocating resources in a call center. Instead of manually allocating call center resources (e.g., manually switching an agent between groups), embodiments of the invention provide a system for automatically allocating call center resources, without requiring intervention by a supervisor. Additionally, embodiments of the invention provide a mechanism for automatically controlling the activities that can be performed by call center resources. The allocation and control of call center resources can be performed by a device, such as a host computer, coupled to the call center. Alternatively, the allocation and control of call center resources can be performed by a device contained within the call center. Other embodiments of the invention provide for the dynamic allocation and control of call center resources.

The teachings of the present invention are applicable to any call center resource. Specific embodiments of the invention are described and illustrated as used to allocate and control call center agents. However, similar procedures and mechanisms can be used to allocate and control other call center resources, such as call center trunks, database links, host computer links, and various call processing systems contained in or coupled to the call center. For example, a particular call center may include multiple voice ports for transmitting announcements to a caller or recording messages from a caller. These voice ports can be allocated, for example, based on agent group or based on particular applications (or types of applications). Other examples of call center resources that can be controlled using the teachings of the present invention are digital signal processing resources and call routing resources used by the call center to process and route calls and other information.

Figure 1:
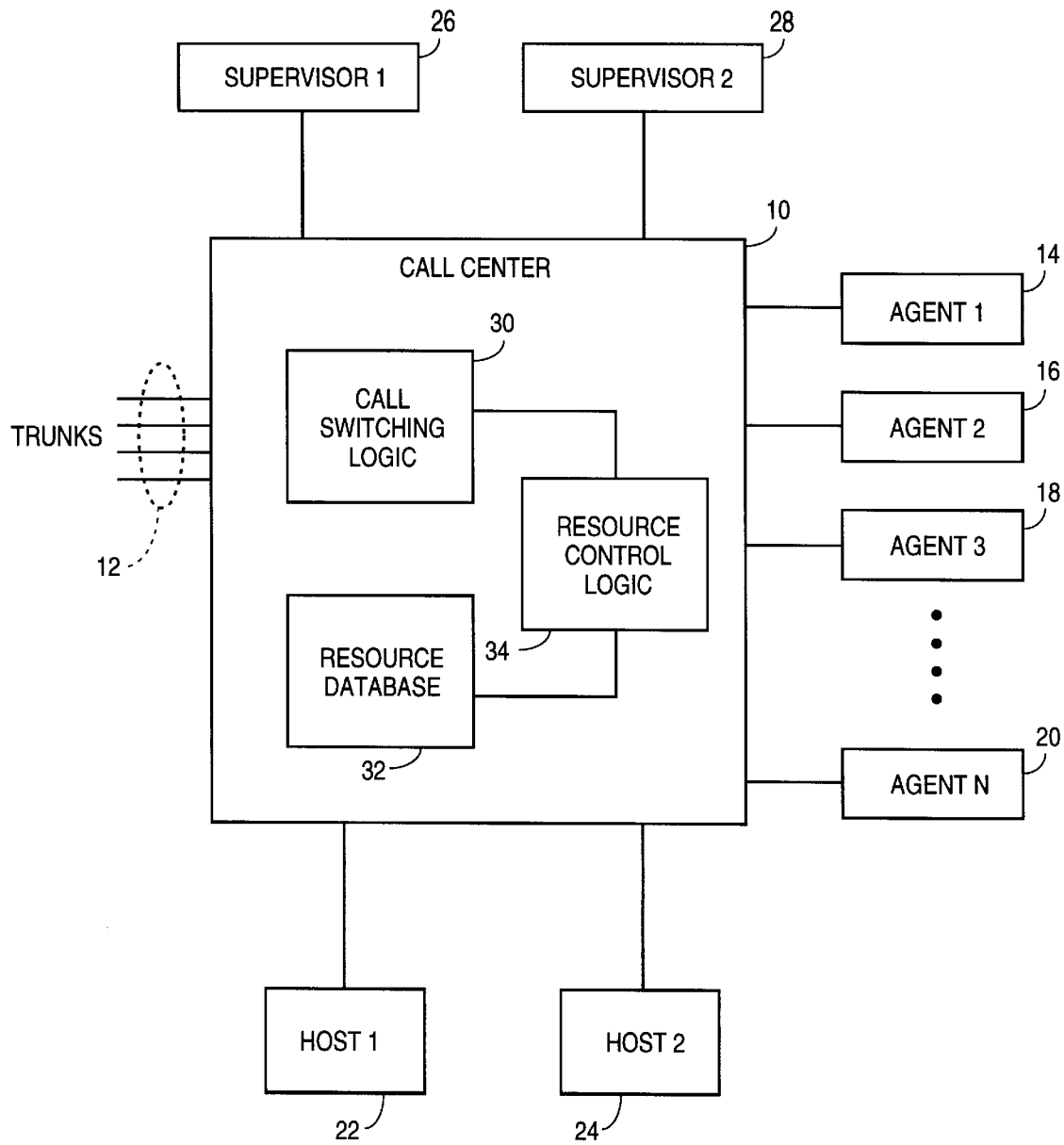
FIG. 1 illustrates an embodiment of a call center environment including a call center coupled to multiple trunks, agents, hosts, and supervisor devices.

FIG. 1 illustrates an embodiment of a call center environment including a call center 10 coupled to various trunks, agents, hosts, and supervisor devices. Call center 10 may be an automated call distributor (ACD) or any other system capable of receiving, processing, routing, transmitting, or otherwise handling telephone calls, video calls, electronic mail, facsimiles, network sessions (e.g., sessions across the Internet), or other information. Multiple trunks 12 are coupled to call center 10 and provide a communication link for receiving incoming telephone calls, and placing outbound telephone calls. Additionally, other communication links (not shown) may be coupled to call center 10 for communicating other types of information to and from the call center. These other types of information include electronic mail, video data, facsimiles, and various types of network information and network-communicated data.

Several agents 14, 16, 18, and 20 are coupled to call center 10. Although only four agents are shown, a typical configuration may include hundreds or thousands of agents coupled to the call center. Call center 10 distributes incoming calls to an agent 14–20 configured to process incoming calls. Additionally, certain agents 14–20 can be configured to participate in an outbound campaign. Additional details regarding allocating agents between incoming call processing and outbound campaigns are discussed below.

A pair of hosts 22 and 24 are coupled to call center 10. Hosts 22 and 24 can be any device capable of communicating with call center 10. In a particular embodiment of the invention, hosts 22 and 24 are processor-based systems. Hosts 22 and 24 may be located near call center 10 (e.g., in the same building) or may be geographically distant from the call center. Although two hosts 22 and 24 are shown in FIG. 1, any number of hosts may be coupled to a particular call center. In a particular embodiment of the invention, host 22 or host 24 is an outbound call management system capable of controlling the processing and flow of outbound calls and outbound call campaigns.

Each host 22 and 24 has a separate communication link to call center 10. In an alternate embodiment, hosts 22 and 24 are coupled to call center 10 through a network or other shared communication mechanism. Hosts 22 and 24 provide a mechanism for issuing commands and resource change requests to call center 10. A resource change request asks the call center to change the allocation of one or more call center resources. For example, host 22 may generate a resource change request asking that particular agents be transferred from processing inbound calls to processing outbound calls. In addition to transmitting information and requests to call center 10, hosts 22 and 24 can receive various information from the call center. For example, hosts 22 and 24 may receive information regarding the volume of incoming calls, confirmation that a requested change has been implemented, and various statistics regarding the operation of call center 10.

A pair of supervisor devices 26 and 28 are coupled to call center 10. These supervisor devices 26 and 28 can be any type of device capable of communicating with call center 10, such as a terminal, or a processor-based system. Supervisor devices 26 and 28 monitor the overall operation of call center 10. For example, supervisor devices 26 and 28 may display statistics regarding overall agent efficiency, individual agent efficiency, or call center statistics, such as the number of calls waiting, the average wait of each call, or the longest waiting call currently in the queue. Although only two supervisor devices 26 and 28 are shown in FIG. 1, other call center configurations may include any number of supervisor devices.

Call center 10 includes call switching logic 30, a resource database 32, and resource control logic 34. Components 30–34 are illustrated because they are specifically used to implement embodiments of the present invention. Although not shown in FIG. 1, call center 10 can include other components to perform various call processing (or transaction processing) operations. A transaction includes any type of call, facsimile transmission, electronic mail, or internet session. These other components may include one or more processors, memory devices, mass storage devices, voice processing devices, display devices, printers, and other components for receiving incoming transactions, placing outbound transactions, displaying or reporting call information, and processing or routing calls and other information within the call center.

Call switching logic 30 switches incoming and outgoing calls between agents 14–20 and one or more trunks 12. Resource database 32 stores various information regarding each of the resources within call center 10 and resources coupled to or available to call center 10. As discussed in greater detail below, these resources may include agents and trunks coupled to the call center as well as various call processing resources within call center 10. Resource control logic 34 handles the control and allocation of the call center resources, as identified in resource database 32. Resource control logic 34 is capable of controlling the implementation of resource change requests received from host 22 or 24.

Figure 2:
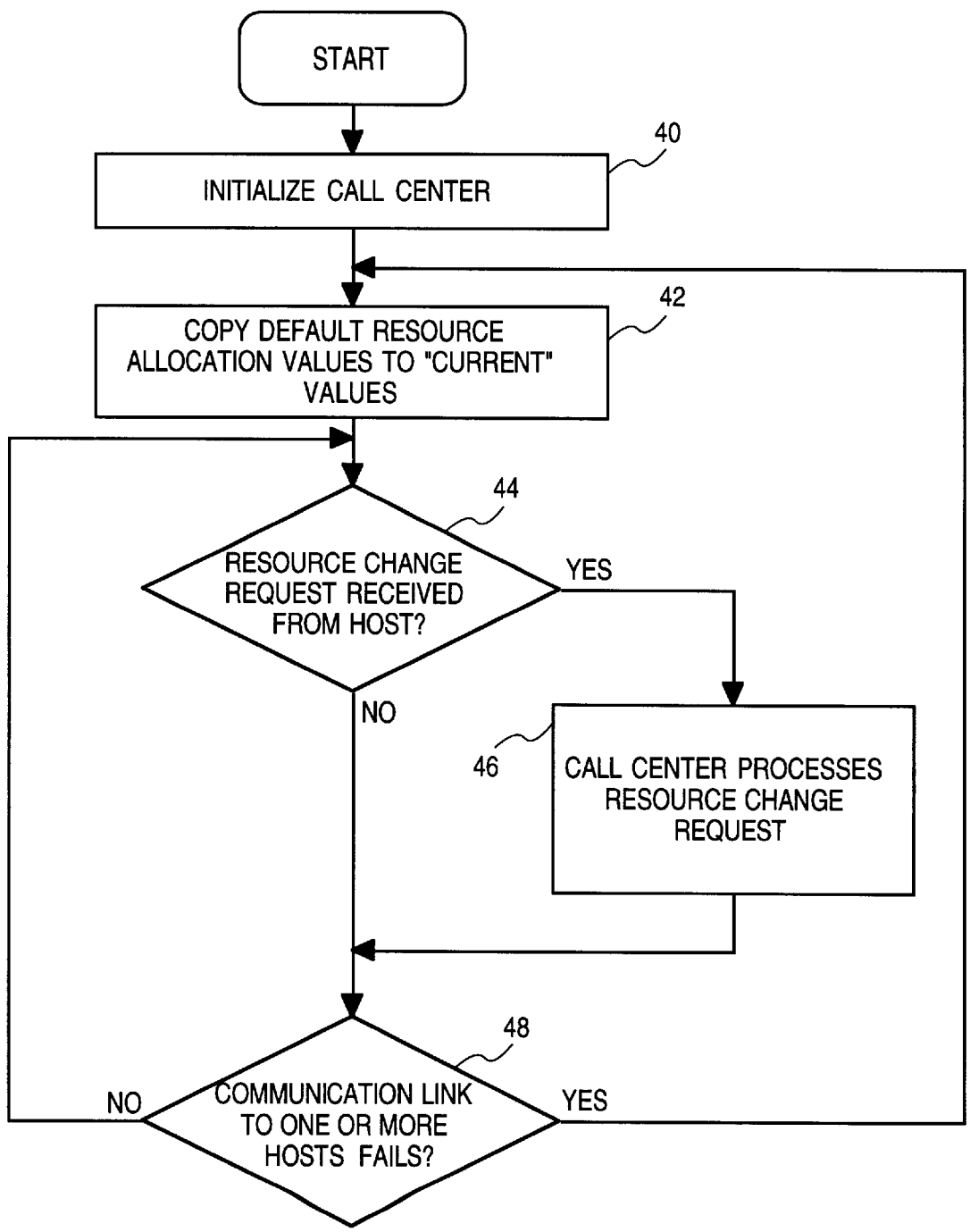
FIG. 2 is a flow diagram illustrating an embodiment of a procedure for providing resource allocation in a call center.

FIG. 2 is a flow diagram illustrating an embodiment of a procedure for providing dynamic resource allocation in a call center. At step 40, the call center is initialized. At step 42, the default resource allocation values are copied to the "current" values. The default values are stored in the call center, for example, on a mass storage device such that the default values can be retrieved from the mass storage device as part of the call center initialization process. During normal operation, the call center uses the "current" resource allocation values to process calls, allocate resources, and control resource operations or activities.

Step 44 determines whether a resource change request has been received from a host coupled to the call center. A resource change request identifies a particular change to one or more resources within the call center. For example, a resource change request may request that various agents be transferred from handling inbound calls to handling outbound calls. Additionally, a resource change request may request that a particular trunk be allocated to a particular group of agents. If step 44 identifies a received resource change request, then the procedure branches to step 46 where the call center processes the resource change request. Additional details regarding the processing of resource change requests are provided below with respect to FIG. 3.

At step 48 of FIG. 2, the procedure determines whether a communication link to one or more hosts has failed. If no failure is identified at step 48, then the procedure returns to step 44 to check for additional resource change requests received from a host. In a particular embodiment of the invention, step 48 is only concerned with communication links to hosts that are actually controlling call center resources. If a particular host is not controlling call center resources, then the failure of its communication link does not change the control of any resources. In this embodiment, if a communication link to a host that is not controlling call center resources fails, the failure is ignored and the procedure returns to step 44 rather than returning to step 42.

In another embodiment of the invention, all communication link failures are ignored. In this embodiment, the current resource allocation values are not changed (i.e., the call center continues operating with its current resource allocation).

If a communication link failure is identified at step 48, then the procedure returns to step 42 to copy the default resource allocation values to the current values. In this embodiment, the procedure copies all default values to the current values whenever a host communication link failure occurs. Thus, the call center will be reset to its default resource allocation, instead of continuing with its previous configuration (which may include one or more changes requested by the host). Since the communication link to the host has failed, the host will be unable to monitor or request changes in the call center resource allocation. Therefore, the default call center configuration is used rather than maintaining the previous version.

In alternate embodiments of the invention, the call center maintains the previous resource allocation values for a particular time period after a communication link between a host and the call center fails. The previous values are maintained based on the expectation that the communication link to the host will be reestablished. If, after the particular time period, the communication link that failed has not been reestablished, then the call center will reset the current resource allocation values to the default values.

Figure 3:
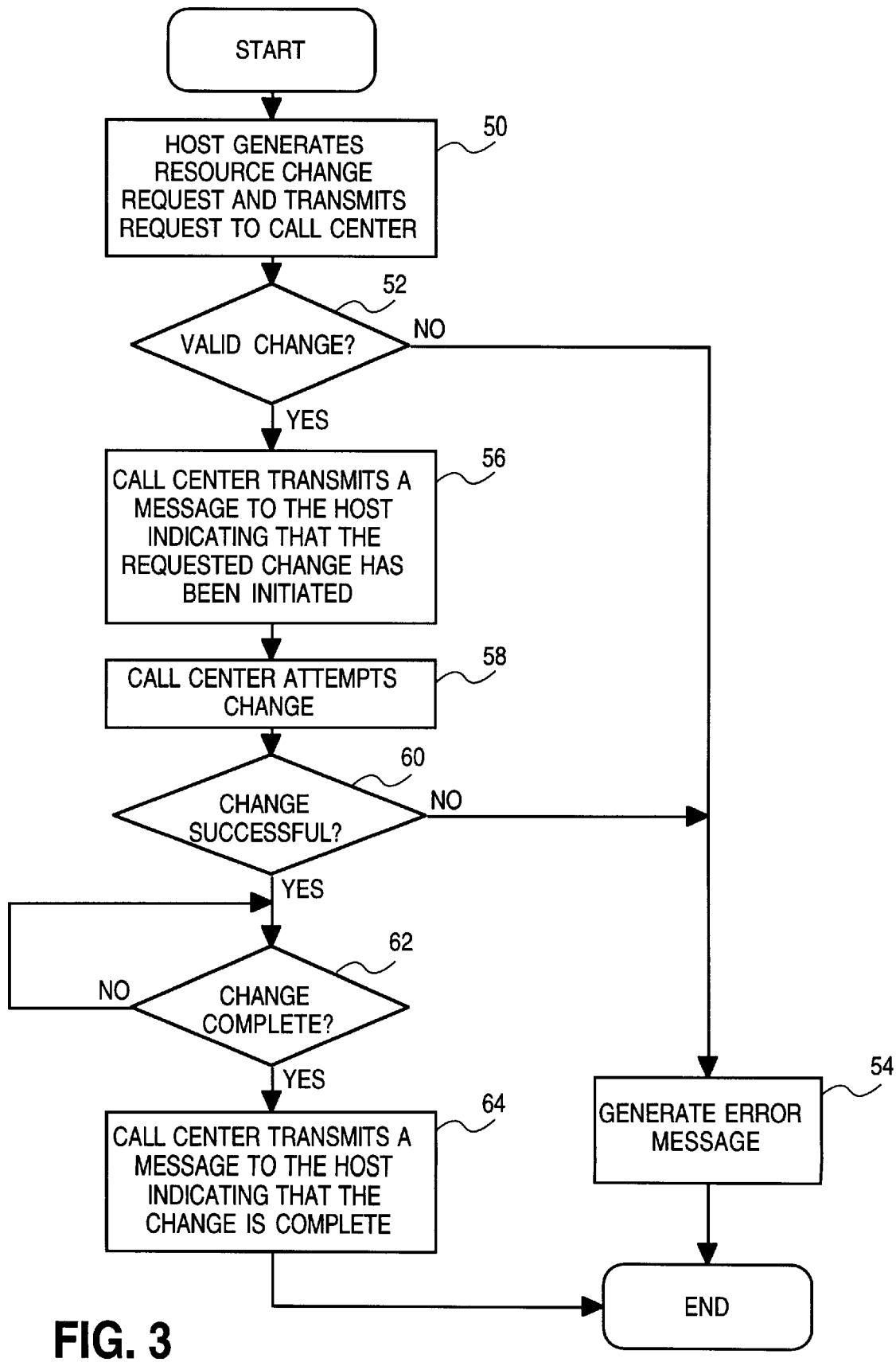
FIG. 3 is a flow diagram illustrating an embodiment of a procedure for processing a resource change request.

FIG. 3 is a flow diagram illustrating an embodiment of a procedure for processing a resource change request. At step 50, a host generates a resource change request and transmits the request to the call center. Step 52 determines whether the resource change request is a valid change. This validation step determines whether the resource to be reassigned actually exists and that the new characteristics or attributes being specified for the resource are available in the call center. For example, a particular resource change request may attempt to reassign an agent to a group that does not exist or is not available in the call center. In this situation, step 52 prevents the requested change. In a particular embodiment of the invention, a request to reallocate various agents from inbound call processing to an outbound campaign may be invalid during certain times of the day (e.g., times during which the volume of inbound calls has been historically high). In this embodiment, step 52 prevents the reallocation of agents during the restricted time periods.

If step 52 determines that the resource change request is requesting an invalid change, then the procedure branches to step 54 where an error message is generated and transmitted to the requesting host. If step 52 determines that the requested change is valid, then the procedure continues to step 56 where the call center transmits a message to the host indicating that the requested change has been initiated, but not yet completed. At step 58, the call center attempts to implement the requested change.

Changes are implemented by changing the current value of the attributes associated with the resource in the resource database. The various attributes associated with a particular resource identify the manner in which the resource is allocated and identify the activities or operations that can be performed by the resource. Depending on the type of change requested, it may take the call center several seconds or several minutes to implement the change. For example, if the change transfers one or more agents from inbound call processing to an outbound campaign, then the call center must wait for the agent or agents to complete their current call before transferring to an outbound campaign. If the agent is idle at the time the change request is received, then the agent can be immediately transferred to the appropriate outbound campaign.

Step 60 of FIG. 3 determines whether the change attempted at step 58 was successful. If the change was not successful, then the procedure branches to step 54 where an error message is generated and transmitted to the requesting host. If the change was successful, then the procedure branches to step 62 to determine whether the change has been completed. If not, the procedure continues checking until the change is complete. A time-out mechanism (not shown) may be used to cause the determination at step 62 to terminate after a particular time period, thereby preventing infinite loops. When the change has been completed, the procedure continues from step 62 to step 64, where the call center transmits a message to the host indicating that the requested change has been completed.

In a particular embodiment of the invention, after a resource change request for a specific resource (such as an agent) has been completed for a particular host, other hosts are prevented from changing or modifying the activities of that specific resource. This prevents a second host from reversing or otherwise modifying specific changes previously requested by a first host.

Figure 4:
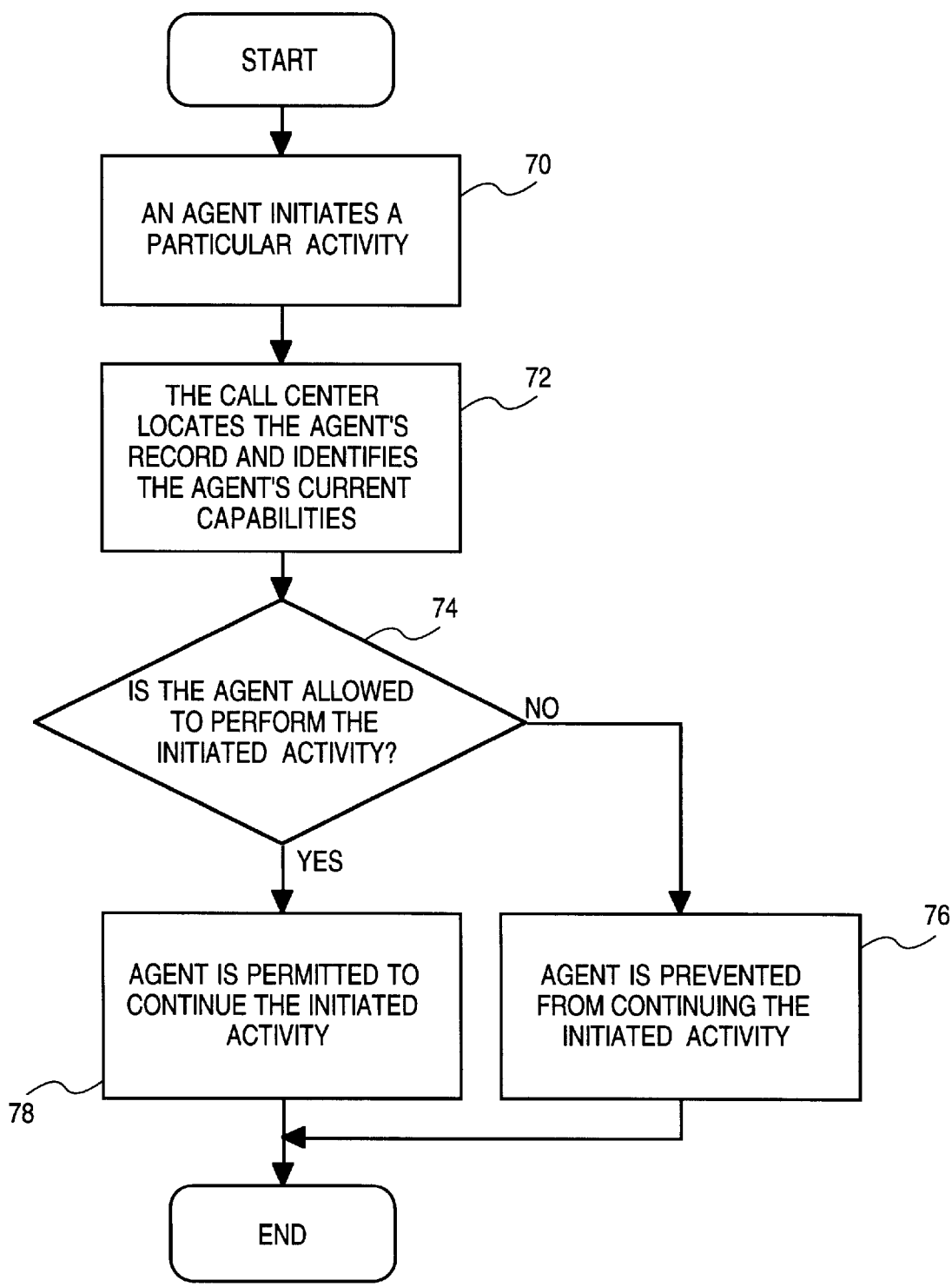
FIG. 4 is a flow diagram illustrating an embodiment of a procedure for controlling activities that may be initiated by an agent.

FIG. 4 is a flow diagram illustrating an embodiment of a procedure for controlling activities (or operations) that may be initiated by an agent. Although a particular embodiment is illustrated for controlling agent activities, alternate embodiments of the procedure can be used to control other resource activities. At step 70, an agent initiates a particular activity. For example, an agent may attempt to contact a supervisor using their telephone, initiate a telephone call to another agent, or initiate an outbound telephone call. At step 72, the call center locates the agent's record and identifies the agent's current capabilities. As discussed below with respect to FIGS. 5 and 6, each agent has various capabilities and various activities that may be performed based on the group, class of service, and supervisor team assigned to the agent.

Step 74 determines whether the agent is allowed to perform the initiated activity. This determination is based on the various attributes in the agent's records that define the agent's capabilities. For example, during an outbound campaign, an agent may be prevented from placing outbound calls or calls to a supervisor or another agent. Any of these activities would cause the agent to become "unavailable" for handling answered outbound calls. Allowing an agent to become "unavailable" to handle answered outbound calls would disrupt the pacing algorithm and other outbound call generation systems that rely on the availability of the agent to handle an answered outbound call.

If step 74 determines that the agent is not capable of performing the initiated activity, then the procedure branches to step 76 where the agent is prevented from continuing the initiated activity. If the agent is capable of performing the initiated activity, then the procedure continues from step 74 to step 78, where the agent is permitted to continue the initiated activity.

Figure 5:
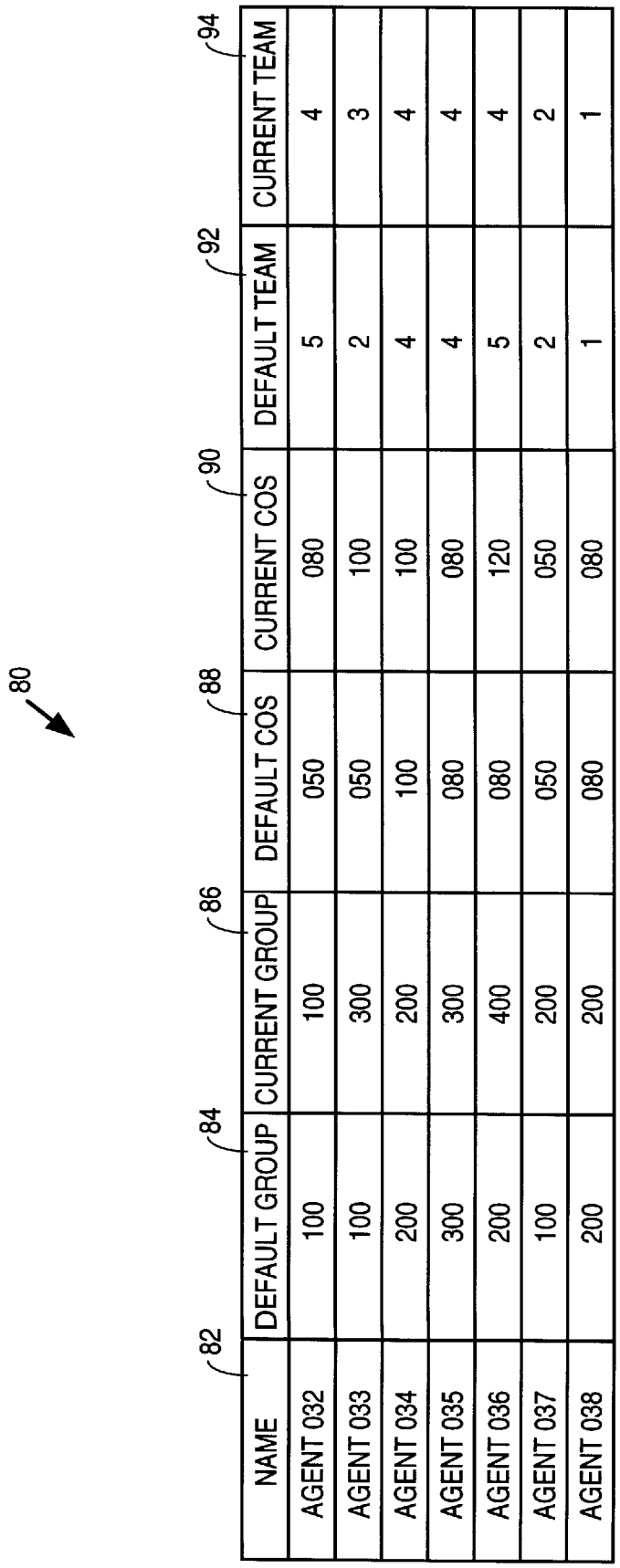
FIG. 5 illustrates an embodiment of a table containing records associated with various call center resources.

FIG. 5 illustrates an embodiment of a table 80 containing records associated with various call center resources. Table 80 includes seven fields (or columns) that identify information about each record. Each row in table 80 identifies a particular record. The information contained in table 80 may be stored in a database, memory device, or other storage mechanism. Table 80 is specifically designed for storing records associated with various call center agents. Other embodiments of table 80 may be provided for other types of resources, such as trunks or call processing mechanisms.

Field 82 in table 80 identifies the name of the agent associated with the remaining fields in the row. A default group field 84 identifies the default group that the agent is associated with. A current group field 86 identifies the current group that the particular agent is associated with. Field 88 identifies the default class of service (COS) for the agent and field 90 identifies the current class of service for the agent. Field 92 defines the default supervisor team that the agent is associated with and field 94 identifies the current supervisor team that the agent is associated with. In a particular embodiment of the invention, the current group, current COS, and current supervisor team values are stored in a fast memory device within the call center, thereby providing fast access to the current values by a device or algorithm associated with the call center.

Referring to the example table 80 shown in FIG. 5, Agent 032 is currently assigned to group 100, which is the same as the agent's default group. Agent 032 is currently assigned a COS 080, which is different than the agent's default COS 050. Agent 032 is currently assigned to supervisor team 4, which is different than the agent's default supervisor team 5. If Agent 032 is transferred from an inbound group to an outbound group, or vice versa, one or more of the current values shown in FIG. 5 may be changed. For example, the current group will change and the COS may change to reflect the permitted activities associated with the new group. Additionally, the agent might be assigned to a new supervisor team. However, since supervisor teams may include multiple groups (both inbound and outbound), transferring an agent between groups does not necessarily change the agent's supervisor team.

FIG. 6 illustrates an embodiment of a table 100 containing various class of service (COS) attributes. The various attributes contained in table 100 define the operations and activities permitted by the class of service. The information contained in table 100 may be stored in a database, memory device, or other storage mechanism. Table 100 is specifically designed for defining classes of service that may be assigned to one or more call center agents. Other embodiments of table 100 may be provided for defining classes of service assigned to other types of resources, such as trunks or call processing mechanisms. Alternate embodiments of the invention use a similar table containing additional attributes and/or omitting one or more attributes shown in table 100.

Each class of service uses one or more of the attributes illustrated in table 100. Class of service number 060 identifies the class of service with which the remaining attributes are associated. Class of service name 104 provides a name for the COS. Instrument type 106 identifies the type of device or instrument associated with the COS (e.g., a telephone set, identified by "T"). Automatic answer attribute 108 determines whether incoming calls to the system will be automatically presented to an agent, or if the agent must manually answer the call upon hearing the ringing of their telephone set. Automatic available 110 identifies whether, at the end of a call, the agent is automatically made available to take another call. Direct trunk selection 112 determines whether an agent can directly access a specific trunk on which to place an outgoing call.

Wrap-up after incoming call attribute 114 identifies whether an agent is automatically provided with a wrap-up time period after an incoming call. Automatic call back 116 determines whether messages from an outside caller requesting to be called back are presented automatically to the agent. Message prompts 118 determines whether an agent will receive audio prompting while processing previously-recorded messages, for example from outside callers. Wrap-up after outgoing call 120 identifies whether an agent is automatically provided with a wrap-up time period after an outgoing call. Help and messaging 122 determines whether the agent is permitted to access audio help and the messaging system. Incoming calls attribute 124 determines whether the agent can receive incoming calls. Supervisor calls attribute 126 identifies whether an agent can make calls to a supervisor. Outbound calls attribute 128 determines whether the agent is permitted to initiate outbound calls.

Figure 7:
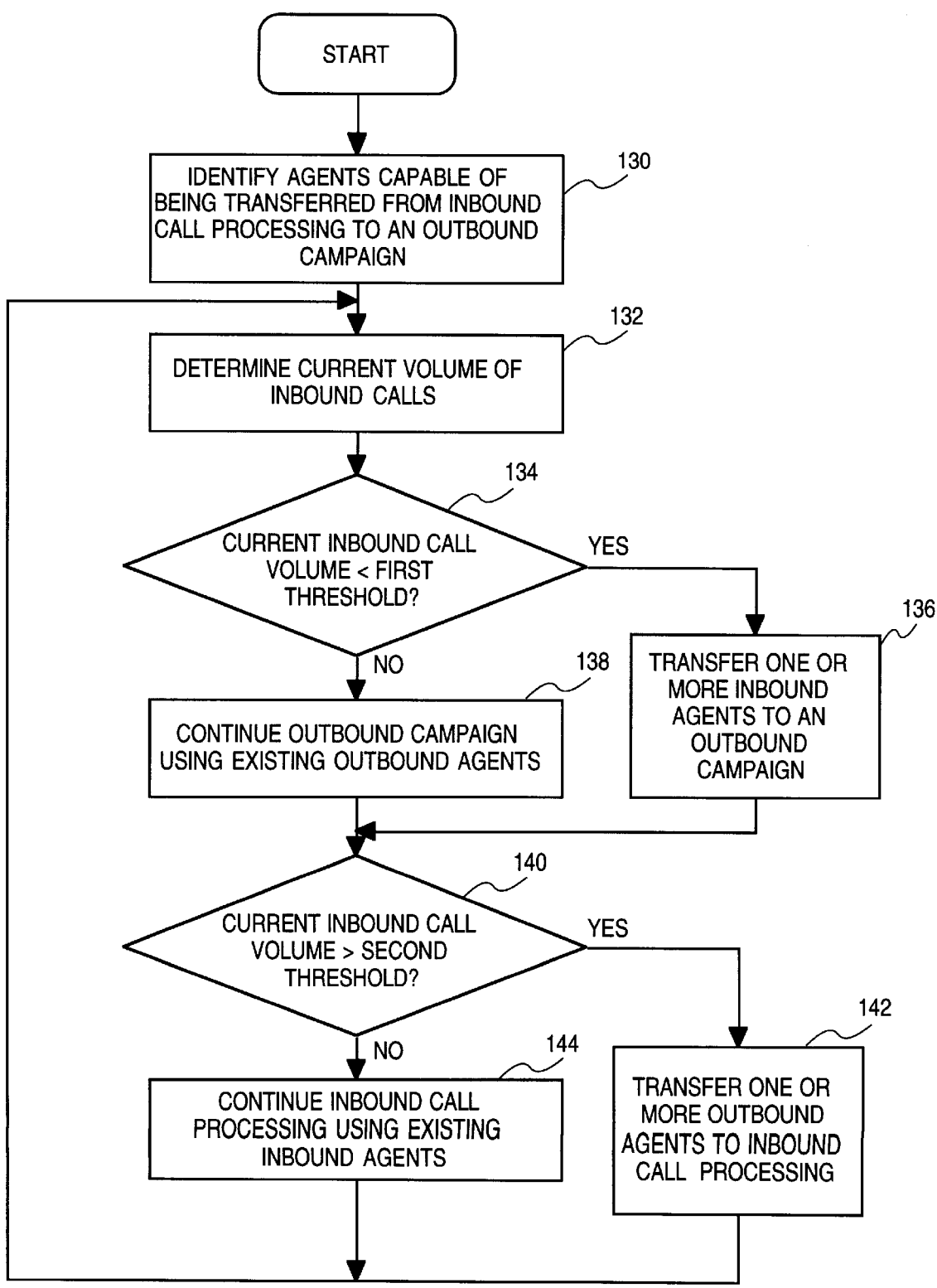
FIG. 7 is a flow diagram illustrating an embodiment of a procedure for transferring agents between inbound call processing and outbound campaigns.

FIG. 7 is a flow diagram illustrating an embodiment of a procedure for transferring agents between inbound call processing and outbound campaigns. Step 130 identifies agents capable of being transferred from inbound call processing to an outbound campaign. Step 132 determines the current volume of inbound calls. This volume may be based on the number of calls waiting in the queue, the average wait of the calls in the queue, the longest waiting call in the queue, or the number of idle agents. Step 134 determines whether the current inbound call volume is less than a first threshold. This first threshold identifies a point at which the utilization of agents for inbound call processing is not efficient (e.g., too many agents are being used for inbound call processing based on the current call volume). The first threshold indicates that one or more of the current inbound agents would be more efficiently utilized in an outbound campaign or handling a different task (e.g., answering electronic mail or voice mail). If the current inbound call volume is below the first threshold, then step 134 branches to step 136 where one or more inbound agents are transferred to an outbound campaign. The number of agents transferred to the outbound campaign depends on the number of agents needed for the outbound campaign and the degree to which the current inbound call volume is below the first threshold.

If step 134 determines that the current inbound call volume is not below the first threshold, then the procedure continues to step 138 where the outbound campaign is continued using the existing outbound agents. At step 140, the procedure determines whether the current inbound call volume exceeds a second threshold. This second threshold identifies a point at which the inbound call volume is relatively high and additional agents are needed to handle inbound calls and improve the quality of service provided to the inbound calls. If the current inbound call volume exceeds the second threshold at step 140, then the procedure branches to step 142 to transfer one or more outbound agents to inbound call processing. The number of agents transferred to inbound call processing depends on the priority of the outbound campaign and the magnitude by which the current inbound call volume exceeds the second threshold. The first and second thresholds can be determined by the call center or by a host coupled to the call center. The threshold values may change automatically in response to the time of day or other factors (e.g., based on historical call volume during particular times of the day).

If the current inbound call volume does not exceed the second threshold in step 140 of FIG. 7, then the procedure continues to step 144 to continue processing inbound calls using existing inbound agents. The procedure then returns from step 142 or step 144 to step 132, thereby continually monitoring the current volume of inbound calls and transferring agents between inbound and outbound call processing, as needed. Thus, the procedure illustrated in FIG. 7 provides for the automatic control and allocation of call center resources based on the incoming call volume. Similar procedures can be used to automatically control and allocate other types of call center resources.

The first threshold and the second threshold identified in steps 134 and 140 of FIG. 7 should be significantly different to avoid continuously transferring agents back and forth between inbound and outbound processing. For example, if the second threshold is only slightly higher than the first threshold, then step 134 may cause agents to be transferred from inbound call processing to an outbound campaign at step 136. During the next cycle of the procedure, this movement of agents may cause step 140 to determine that the current inbound call volume exceeds the second threshold, thereby causing one or more outbound agents to be transferred back to inbound call processing. This repeated transfer is inefficient and disruptive to the agents. Therefore, the first and second threshold should be significantly separated to avoid this problem. This problem can also be avoided by slowly transferring agents between inbound and outbound processing. Thus, the transfer of agents is performed incrementally until the current volume of inbound calls is maintained in the region between the first and second thresholds.

In another embodiment of the invention, certain agents are transferred from inbound call processing to an outbound campaign at a particular time. In this embodiment, agents are transferred at a particular time of the day, rather than based on incoming call volume. For example, a particular outbound campaign may be scheduled to begin at 7:00 pm, a time at which, historically, a high percentage of individuals are home to answer the outbound calls. In this example, certain agents are transferred to the outbound campaign at 7:00 pm, regardless of the current incoming call volume. The number of agents transferred to the outbound campaign may be predetermined (e.g., 100 agents will be transferred to the campaign).

In an alternative embodiment, the number of agents transferred to the outbound campaign is based on the current incoming call volume. In this embodiment, a minimum number of agents (e.g., 50 agents) may be transferred to the outbound campaign. Additionally, another 75 agents may be transferred based on the incoming call volume. Thus, if the incoming call volume is high, a total of 50 agents are transferred to the outbound campaign. However, if the incoming call volume is low, a total of 125 agents (50 minimum and an additional 75) are transferred to the outbound campaign. Thus, a varying number of agents will be transferred to the outbound campaign based on the current incoming call volume.

Figure 8:
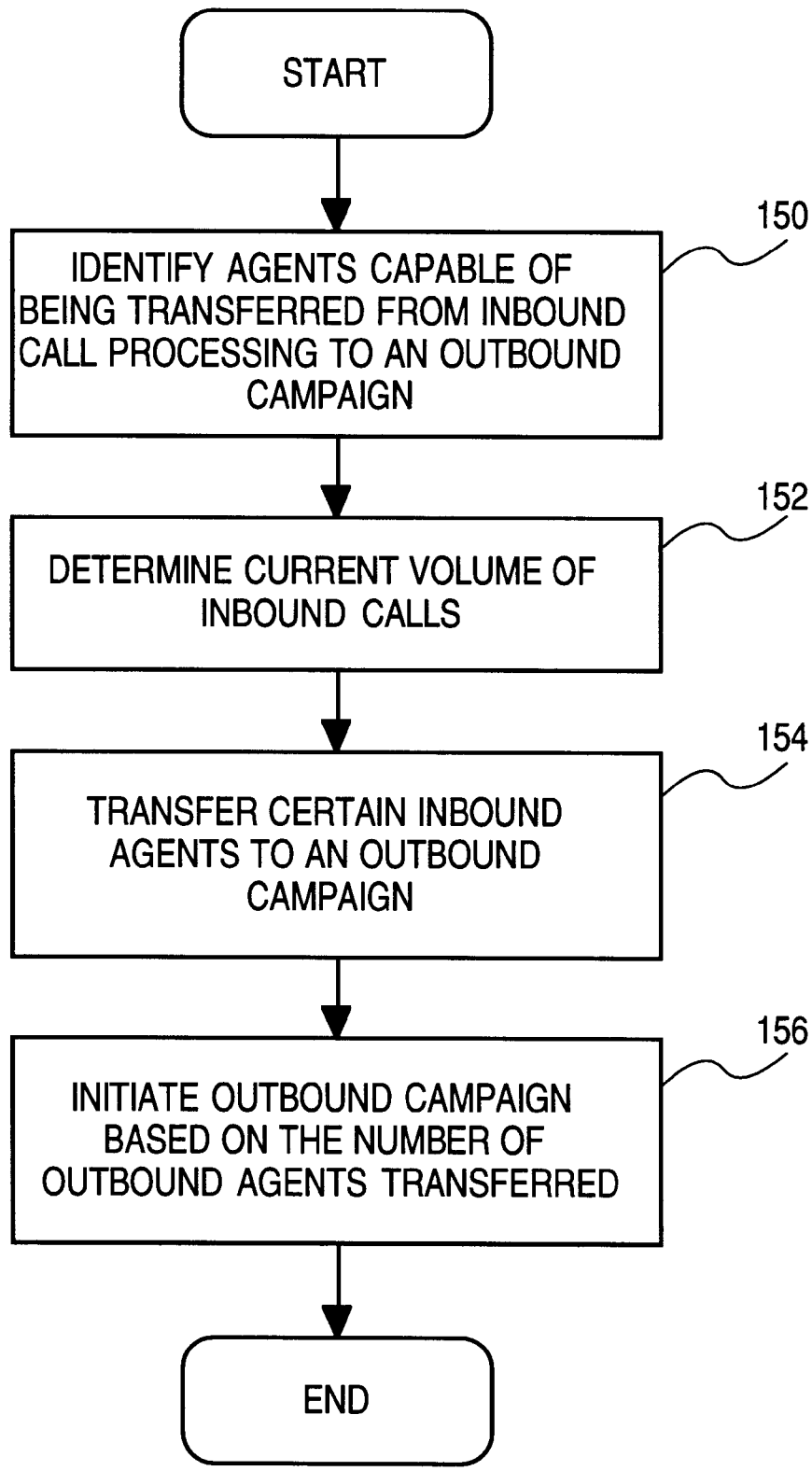
FIG. 8 is a flow diagram illustrating an embodiment of a procedure for initiating an outbound campaign.

FIG. 8 is a flow diagram illustrating an embodiment of a procedure for initiating an outbound campaign. The outbound campaign may be initiated based on the time of day (as discussed above), current incoming call volume, or other factors. Step 150 identifies agents capable of being transferred from inbound call processing to an outbound campaign. Step 152 determines the current volume of inbound calls. This step is optional, and is performed in situations where the inbound call volume is used to determine the number of agents to transfer. Step 154 transfers a particular number of inbound agents to an outbound campaign. The number of agents transferred may be based on the current volume of inbound calls, the priority of the outbound campaign, or the historical volume of inbound calls at this particular time, or during an upcoming time period. Step 156 then initiates the outbound campaign by placing outbound calls in response to the number of outbound agents transferred to the outbound campaign.

In a particular embodiment of the invention, an agent transferred to an outbound campaign is "locked" to the outbound campaign until the campaign is complete or the host or other system controlling the campaign releases the agent. This "locking" prevents another host or call center system from transferring agents away from the outbound campaign until the campaign is complete or the agent is released from the campaign.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for allocating resources in a call center, the method comprising:

identifying a record associated with a resource in the call center, wherein the record includes an attribute indication associated with the operation of the resource;

controlling operation of the resource in response to the attribute indication contained in the record associated with the resource;

modifying the record associated with the resource in response to a resource change request generated by a host coupled to the call center by a communication link, the record being modified to include a modified attribute indication; and in response to a failure of the communication link by which the host is coupled to the call center, copying a default attribute indication to the record to overwrite the modified attribute indication.

2. The method of claim 1 wherein the record contains a plurality of attribute indications associated with the operation of the resource.

3. The method of claim 1 wherein the resource change request is generated by a device contained within the call center.

4. The method of claim 1 further including repeating the controlling and modifying in response to each subsequent resource change request.

5. The method of claim 1 wherein the modified record provides a different set of permitted activities for the associated resource.

6. The method of claim 1 further including notifying the host generating the resource change request after the record has been modified.

7. The method of claim 1 wherein the resource is a call center agent.

8. The method of claim 7 wherein the record associated with the call center agent identifies a group to which the agent belongs.

9. The method of claim 7 wherein the record associated with the call center agent identifies a class of service associated with the agent.

10. The method of claim 9 wherein the class of service determines whether the agent is permitted to perform one or more activities.

11. The method of claim 7 wherein the record associated with the agent identifies a supervisor team to which the agent belongs.

12. The method of claim 1 wherein the modifying prevents modification of the record associated with the resource until the resource is available to be modified.

13. The method of claim 1 wherein the call center is an automated call distributor (ACD).

14. An apparatus for allocating resources in a call center, the apparatus comprising:
a storage mechanism to store a record associated with a resource in the call center, wherein the record includes an attribute indication associated with the operation of the resource;
a resource control mechanism coupled to the storage mechanism and to control operation of the resource in response to the attribute indication contained in the record associated with the resource; and
a host, coupled to the call center by a communication link, to modify the record to generate a modified attribute indication, wherein a default attribute indication is copied to the record to overwrite the modified attribute indication in response to a failure of the communication link by which the host is coupled to the call center.

15. The apparatus of claim 14 wherein the storage mechanism contains multiple records associated with multiple resources in the call center.

16. The apparatus of claim 14 wherein the record contains a plurality of attribute indications associated with the operation of the resource.

17. The apparatus of claim 14 wherein the resource is a call center agent.

18. The apparatus of claim 14 wherein the resource control mechanism is to prevent modification of the record associated with the resource until the resource is available to be modified.

19. The apparatus of claim 14 wherein the apparatus is contained within the call center.

20. The apparatus of claim 14 wherein the apparatus is coupled to the call center.

21. An apparatus for allocating resources in a call center, the apparatus comprising:
means for storing a record associated with a resource in the call center, wherein the record includes an attribute indication associated with the operation of the resource;
means for controlling the operation of the resource in response to the attribute indication contained in the record associated with the resource, wherein the controlling means is coupled to the storing means; and
means, coupled to the call center by a communications link, for modifying the record to generate a modified attribute indication, wherein a default attribute indication is copied to the record to overwrite the modified attribute indication in response to a failure of the communication link.

22. The apparatus of claim 21 wherein the means for storing contains multiple records associated with multiple resources in the call center.

23. The apparatus of claim 21 wherein the record contains a plurality of attribute indications associated with the operation of the resource.

24. The apparatus of claim 21 wherein the means for controlling is configured to prevent modification of the record associated with the resource until the resource is available to be modified.

25. The apparatus of claim 21 wherein the apparatus is contained within the call center.

26. The apparatus of claim 21 wherein the apparatus is coupled to the call center.

* * * * *